United States Patent [19]

Stanley

[11] Patent Number: 4,773,450
[45] Date of Patent: Sep. 27, 1988

[54] INTERLINING OF FLUID TRANSPORT PIPELINES, PIPES, AND THE LIKE

[75] Inventor: Robert K. Stanley, 698 Geneva Pl., Tampa, Fla. 33606

[73] Assignees: Robert K. Stanley; Charles A. McClure, both of Tampa, Fla.

[21] Appl. No.: 655,799

[22] Filed: Oct. 1, 1984

Related U.S. Application Data

[63] Continuation-in-part of Ser. No. 563,065, Dec. 19, 1983, abandoned.

[51] Int. Cl.$^4$ .................. F16L 55/18; E21D 11/00; B29C 63/34; B29C 67/22
[52] U.S. Cl. .................. 138/98; 138/140; 138/149; 138/DIG. 9; 156/78; 156/287; 264/34; 264/45.3; 264/46.1; 264/46.9; 264/54; 264/173; 264/257; 264/269; 264/DIG. 5
[58] Field of Search ............ 264/46.1, 46.9, 34, 264/45.3, 54, 173, 257, 269, DIG. 5; 138/98, 140, 149, DIG. 9; 156/78, 287

[56] References Cited

U.S. PATENT DOCUMENTS

4,368,091  1/1983  Ontsuga et al. ............ 138/97 X
4,386,628  6/1983  Stanley ............ 138/97

OTHER PUBLICATIONS

*The Encyclopedia of Patent Practice and Invention Management*, Robert Calvert, Edt., New York, Reinhold, ©1964, pp. 131–142.

*Primary Examiner*—Philip Anderson
*Attorney, Agent, or Firm*—Charles A. McClure

[57] ABSTRACT

Pipes or pipelines for transporting sewage, water, slurries, liquid and gaseous hydrocarbons, and the like are interlined with flexible composite tubular lining material. The lining material is matched to the crosswise dimension of the pipe and is adapted to be insertable thereinto and to fit snugly against the inner wall thereof. The lining material comprises a flexible matrix member having a netlike open-meshed configuration, thereby being adapted to receive into its interstices foamable material adapted to expand outwardly upon foaming, into and about irregularities in the wall surface, and to solidify there. The matrix member preferably is extensible lengthwise, and thus reducible in size crosswise, when under axial tension. When released from axial tension, the matrix member recovers to its previous dimensions, except as it may be confined, as against an inside wall of a pipe or pipeline. An inner skin layer contiguous with the matrix member, and (at the user's option) an outer skin layer, complete the lining material. The lining may be applied either before a pipe or pipeline is placed in service or afterward—and either in situ or whenever a length of pipe is removed for maintenance or repair.

26 Claims, 6 Drawing Sheets

INTERLINING OF FLUID TRANSPORT PIPELINES, PIPES, AND THE LIKE

This is a continuation-in-part of my pending application, Ser. No. 563,065 filed Dec. 19, 1983 and now abandoned.

This invention relates to lining of circumferential passageway-defining structures, such as sewers, water pipes, pipelines for transporting slurries, reactive chemicals, liquid and gaseous hydrocarbons, or the like.

There is a need for a pipe lining that can be installed in existing pipelines to accommodate a wide range of surface defects and to prevent leakage of pipe contents to the outside when in use and also to prevent incursion of substances from the outside. New pipes as well can be improved by being lined to protect them from some of the adverse effects of future accidental damage and inevitable deterioration. Pipe linings should be durable, nonreactive with pipe contents, and preferably nontoxic so as to be suitable for use in the transporting of potable water or of other fluid compositions intended for human consumption, or for use as components of foods, or for application to crops to be consumed. Materials and methods are known for lining passageways, such as pipes, with flexible materials (e.g., Harper et al. U.S. Pat. No. 2,794,758), some of which may be rigidifiable in place (e.g., Lang U.S. Pat. No. 3,132,062 and Wood U.S. Pat. No. 4,009,063). However, they fail to meet the lining needs met through this invention.

The present inventor has disclosed in U.S. Pat. No. 4,368,628 and in the aforementioned application a variety of lining methods and products that employ composite layered materials including at least one component expansible against the inside wall of a pipe or conduit. By the present invention he now extends and improves those methods as a further contribution to the art of interlining transport pipelines especially, often called simply "pipes" here.

A primary object of this invention is leakproof interlining of pipelines for transporting sewage, water, slurries, liquid and gaseous hydrocarbons, reactive chemicals, and the like.

Another object of this invention is construction of pipe linings adapted to compensate for whatever surface irregularities may be encountered at the inside wall of pipes so lined.

A further object of this invention is provision of flexible composite lining material to accomplish the foregoing objects.

Yet another object of the invention is to dimension material for lining pipes to ensure that the resulting lining fits snugly.

An even further object of the present invention is to assure final dimensional stability of such composite lining material.

Other objects of this invention, together with means and methods for attaining the various objects, will be apparent from the accompanying drawings and the following description of varied embodiments thereof, which are presented by way of example rather than limitation.

In general, the objects of the present invention are attained by providing, for a circumferential passageway-defining structure, a flexible tubular lining material matched thereto in crosswise dimensions and adapted to be drawn thereinto and to fit against the inner wall thereof. The lining material comprises a flexible open meshed matrix member temporarily extensible lengthwise and reducible crosswise when under axial tension and recoverable to its previous dimensions upon release of tension—except as it may be confined against an inside wall of a pipeline or similar structure. The lining also comprises foamable material within the interstices of the meshed matrix member and adapted to expand radially outward upon foaming and to solidify in place, and an inner skin layer, and optionally an outer skin layer also.

Figure 1:
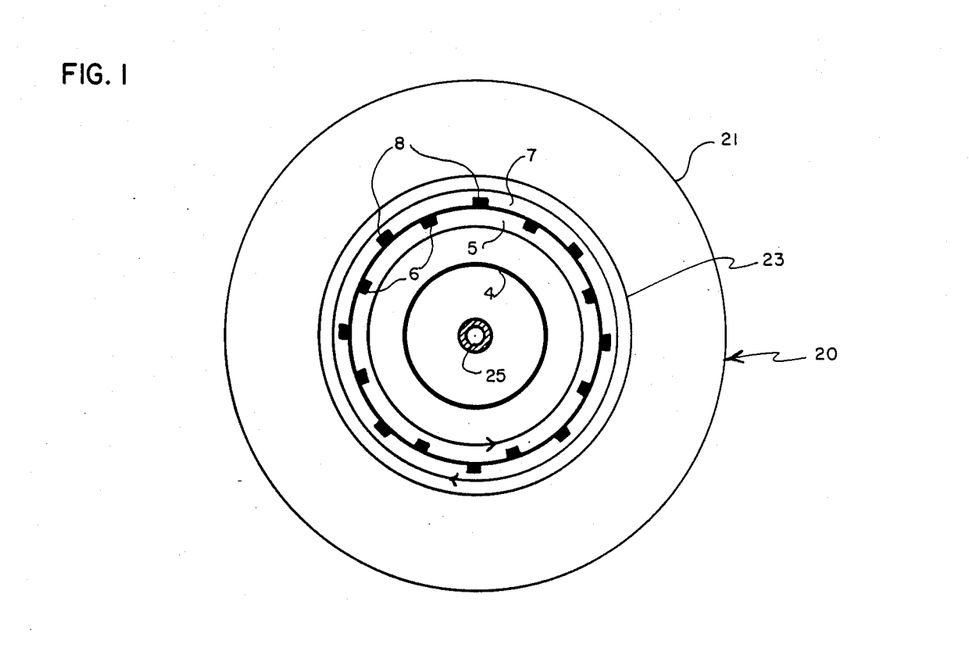
FIG. 1 is an end elevation of extrusion apparatus suitable for forming materials for use according to this invention.
Figure 2:
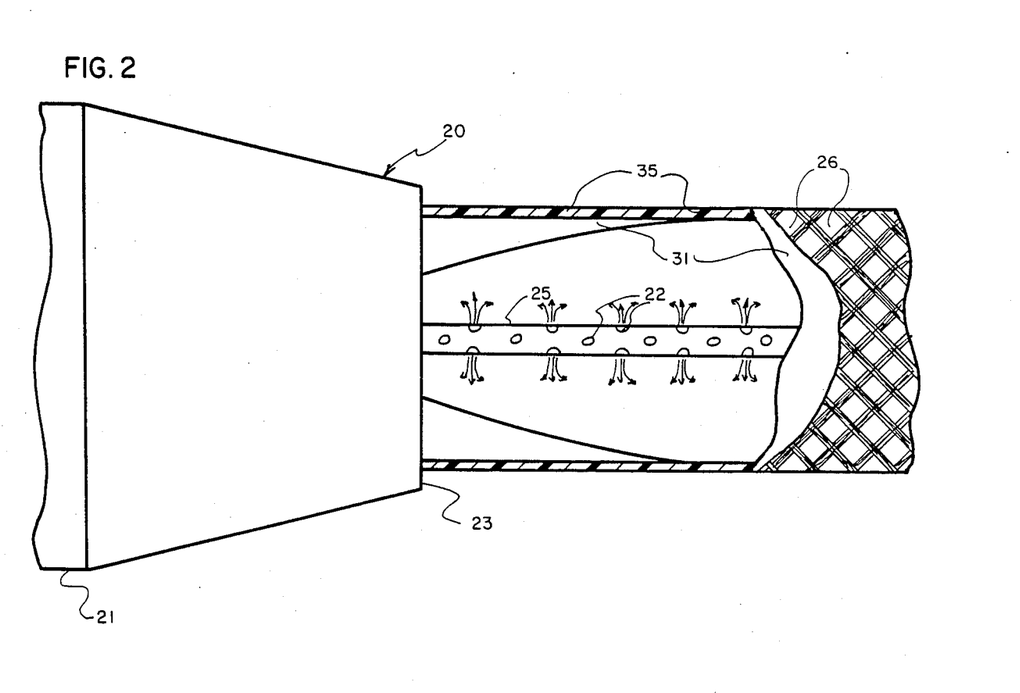
FIG. 2 is a side elevation, partly cut away and partly in section, of the same extrusion apparatus and of tubular lining materials being formed thereby.

FIGS. 1 and 2 show from the front (i.e., downstream) end and from the side, respectively, extrusion apparatus 20. Visible in FIG. 1 (only) are front face 23 and, at a greater radius from the axis, the oblique portion of body 21.

FIG. 1 shows ringlike extrusion slit 4 (for the inner skin) concentrically surrounding axial pipe 25 and, at progressively greater radii, a pair of rings 5 and 7, each of which has a plurality of orifices (for the matrix member) evenly spaced along the edge thereof and adjoining the other ring in the pair. As indicated by oppositely directed arrows, each of the rings is adapted to be rotated about the axis, so that the strands of material extruded from its orifices follow similar helical path about the axis upon being drawn away from the extruder face. The respective rings rotate in opposite directions, so that, each time the orifices from one ring abut the orifices of the other, the two oppositely directed helical strand assemblages fuse to one another, thereby producing apex-defining crossovers or intersections of open meshes in resulting matrix member 35.

A further description of such apparatus well known in the art, is found in Mercer U.S. Pat. No. 2,919,467, which describes means and methods for forming various diamond-shaped meshes in what he calls Net-Like Structures. As shown here, the present invention is exemplified with a simple diamond-shaped open-mesh or netlike structure, such as in Mercer's FIG. 21.

Visible in FIG. 2 (only) are the respective extruded tubular materials: meshed matrix member 35 and, inside it, inner skin 31—both cut away in the vicinity of the extruder face. Shown in transverse or end elevation is the face of extruder head 23 with meshed tubing 35 being extruded from it. Also visible, being extruded at a lesser diameter from the head, is tubular inner skin 31, which—shortly after extrusion and while the extruded materials are still hot enough to fuse to one another—is forced outward by air blowing out from openings 22 in support tube 25 and into fusing contact with the inwardly directed (toward the axis) surface of the meshed tubing. The axis of the extrusion apparatus is shown horizontal here but may be vertical or in any other desired orientation.

Figure 3:
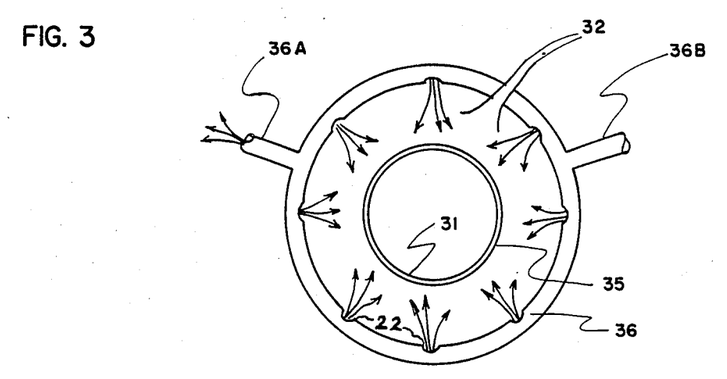
FIG. 3 is an end elevation of further formation of composite tubular lining material according to the invention.

FIG. 3 shows, end-on, the composite tubular lining material of FIG. 2 (made up of inner skin 31 fused to meshed matrix member 35) passing through spray ring 36. Arms 36A, 36B of the spray ring provide inlets, indicated by arrows, for foamable material 32 sprayed from openings 22 onto matrix member and into the mesh openings or interstices thereof. The spraying rate and the rate of transport of the tubular material are coordinated so that the interstices become nearly filled with the foamable material, rather than overflowing with it. Foamable material is preferably supplied as a sprayable gel in order to ensure that it stays in place thereafter despite further handling of the lining material 30 before installation.

Figure 4:
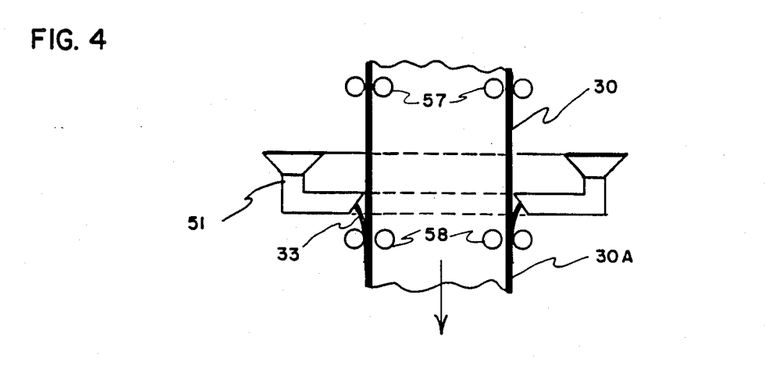
FIG. 4 is a side elevation, partly sectioned away, showing application of an optional outer skin layer to such composite lining material moving vertically downward.

FIG. 4 shows the composite tubular material sectioned in part, now denoted as 30, after treatment as in the preceding view, and in a different orientation. Here the lining material is moving vertically downward, as indicated by the arrow, between and from upper set of rollers 57 to and through lower set of rollers 58. Meanwhile it passes within ring extruder 51, shown schematically, which surrounds the outer surface of the tubular material and extrudes outer skin material 33 onto the entire circumferential surface thereof. The lower rollers press the extruded material into an outer skin layer onto the matrix member whereupon the reference numeral of the resulting composite lining material is changed, thus: 30A to distinguish the lining material with the optional outer skin from the standard material with an inner skin only. A positive forwarding (or braking) ring, such as is disclosed in my aforementioned pending patent application, derived from the disclosure in Keuchel U.S. Pat. Nos. 4,085,175 and 4,141,773, may be substituted in one or both sets of rollers.

Figure 5:
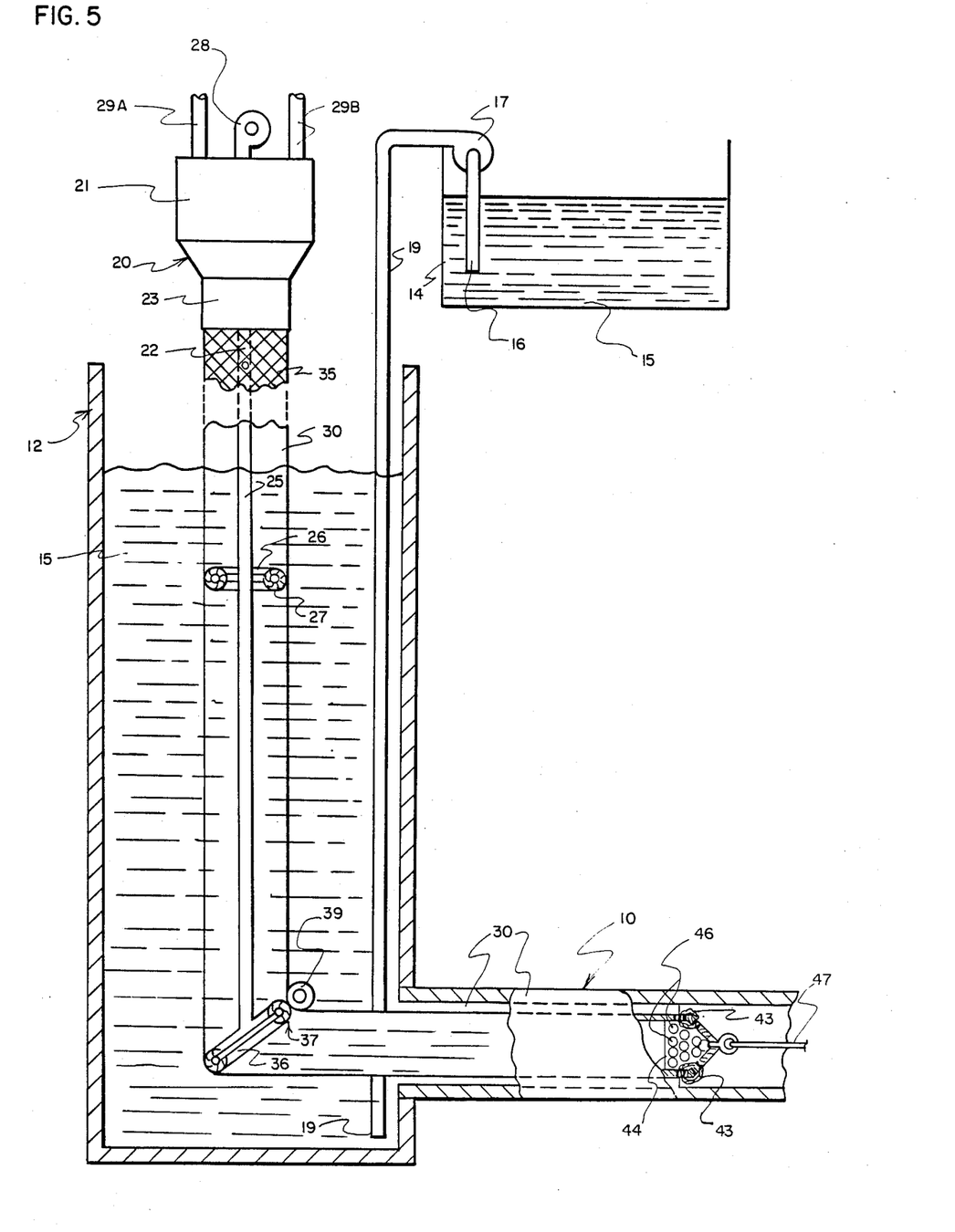
FIG. 5 is a side elevation, partly in section, showing the formation of composite lining material of this invention and its insertion under tension into an underground pipeline.

FIG. 5 shows in side elevation, partly sectioned away, the lining of an underground sewer pipe in situ, with extrusion and related apparatus located at ground level and therebetween. Sewer pipe 10 is visible at the lower right. Extending downward thereto from approximately ground level at the left of the pipe is open-topped access enclosure 12, sometimes called a chimney (often tapered inward conically at the top—but not so shown here—and usually supplied with a manhole cover, also not shown, for its top opening). Tank 14 located above ground and containing liquid 15 (water) has pump 17 for supplying and withdrawing such liquid to and from the enclosure and sewer pipe, through inside pipe 16 connected to pipe (or hose) 19 extending to near the bottom of the chimney.

Extruder 20, suitably supported at about ground level by means not shown, has its extrusion head 23 oriented downward into the open top of enclosure 12. Extending further downward and concentric with the head is hollow support 25 for spider 26, which carries hollow toroidal inner ring 27. On the base at the other (upper) end of the central axis of the extruder is air pump 28, with its intake open to the atmosphere, which discharges through lateral openings 22 in the upper portion of support 25. The extruder base has inlet pipes 29A and 29B for separate feed materials, which may be dissimilar polymeric compositions, such as may be desired for the matrix member and the skin(s).

Also shown in FIG. 5 is meshed matrix member 35 formed at the extruder head and being withdrawn downward from it, partly by gravity and partly by withdrawal force applied to its leading end. The formation of entire composite lining material 30 (or 30A)—which takes place here also—has been described and shown in more detail above in the first few views. Accordingly, those parts and steps are omitted from this view, which is broken away (joined by broken lines) accordingly, showing the outer surface of meshed matrix member 35 above the break and that of completed composite tubular lining material 30 below the break. The outer skin layer is usually omitted unless the foamable gel material is water-soluble (rare). Passage of the tubular lining composite material into the water, which flows inside the leading end held open by perforated block 44, quenches the component polymeric compositions, still warm from the extrusion.

As so formed, the tubing is matched (approximately equal) in crosswise dimensions to the sewer pipe. The extruder head accommodates interchangeable ringlike orifice plates of various diameters (not separately shown) to suit diverse pipe dimensions. The meshed tubing, which is flexible laterally as well, passes under idler roller 39 at the bottom of the enclosure and around canted ring 37, which is supported on spider 36 at the bottom of tube 25, and then horizontally into sewer pipe 10. The leading end of tubing 30 (in the sewer pipe) is retained by block 44, which has openings 46 therethrough to allow water (and air) to pass therethrough into and out of the tubular lining end. The block is retained in the tubing end by ties 43 through the block openings and through mesh openings of the component matrix member and holes made through the inner skin to accommodate the ties. Forwarding tension applied by the block to the meshed matrix member as the principal structural component of the composite lining draws it into and through the pipe. If necessary, such tension extends it lengthwise and thus contracts it crosswise, thereby necking it down enough so that the lining material enters the sewer pipe, with the outer surface of the tubing sliding against at least part of the inside wall of the pipe, with or without a narrow gap elsewhere.

Figure 6A:
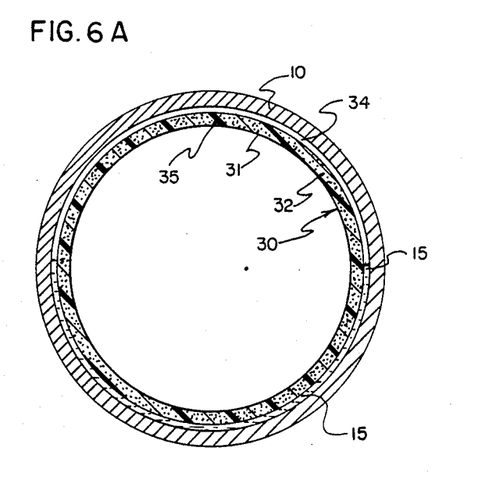
FIGS. 6A and 6B are transverse sectional elevations, on an enlarged scale, of the composite lining material in such an underground pipeline (after release of such tension) before and after expansion of an interstitial foam layer.

FIG. 6A shows the resulting cross-sectional appearance (on an enlarged scale) of the resulting tubular lining inside the pipe. Tubular liner 30 is a 3-component laminate (as alternative tubular liner 30A, with the optional outer skin layer, is a 4-component laminate), including inner skin layer 31, matrix member 35, and interstitial foamable layer 32 (shown stippled). A thin layer of water 15 is shown between the outside of the liner and the lower part of the inside wall of the pipe, and a thin air gap above it, as may occur despite closer fit of the liner elsewhere in the pipe. When the tubing has been pulled to the opposite end (not shown) or other accessible intermediate part of the pipe, the pulling (and the extrusion) are stopped. Then foaming of the foamable material is actuated, as by circulating hot air in contact with the tubing after draining the water from the pipe. Foaming expands the foamable material—confined by the inner skin—outward against the pipe wall, progressively expelling any air or water from in between, and the foam solidifies in place.

Figure 6B:
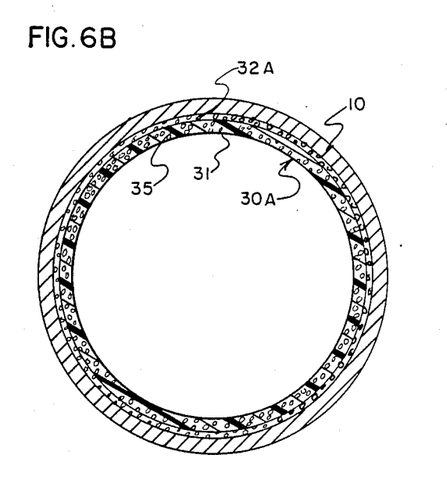

FIG. 6B shows similarly the cross-sectional appearance of the resulting lined pipe. Previous layer 32 of foamable material has expanded outwardly beyond the interstices of the meshed matrix member against the inside wall of the pipe (or against the intervening outer skin layer, when present). Here the resulting cellular layer (shown with small circles) is designated 32A to indicate the change in its structure. Expansion of the foam compensates for wall irregularities or any minor breaks, whereas solidification of the foam reinforces the matrix member and rigidifies the lining in place, thereby completing a permanent in-place liner in the pipe.

The following views show an alternative embodiment in which the meshed matrix member is inserted into the pipe before being combined with other previously mentioned lining materials, such as foamable material, an inner skin, or an outer skin.

Figure 7:
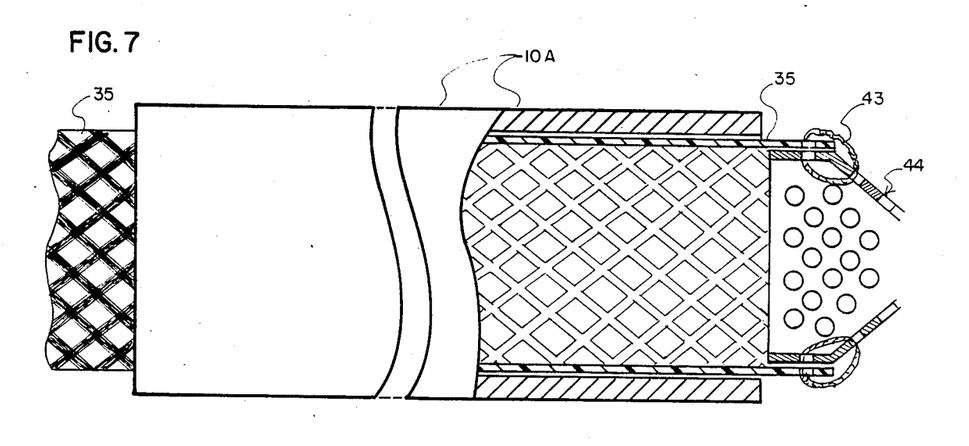
FIG. 7 is a side elevation, partly in section, of similar insertion of a netlike open meshed matrix member separately into a pipe.
Figure 8A:
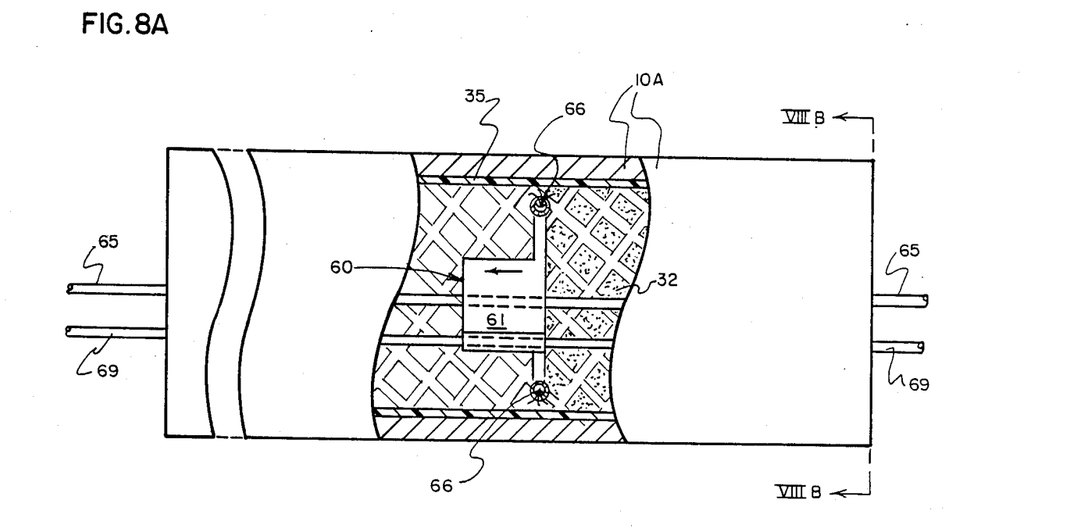
FIGS. 8A and 8B are longitudinal and transverse sectional elevations, respectively, of the application of foamable material to the inserted matrix member.

FIG. 7 shows meshed matrix member 35 in tubular form being pulled into an open end of pipe 10A and along its inside wall to a rest position therein, as shown in FIG. 8A, where the pulling tension has been released, enabling the matrix member to expand snugly against the inside wall. This is drastically simplified as compared with the FIG. 5 showing of the underground procedure, inasmuch as the pipe here is new—or if not new—is clean and empty to start with and is much more readily accessible.

The extension or temporary increase in length of the matrix member is evident in FIG. 7 from the fact that the longer mesh axis (from apex to opposite apex) of the diamond-shaped openings is substantially aligned with the longitudinal direction, whereas in the relaxed or tension-free view of FIG. 8A the transverse mesh axis, which is more aligned with the circumferential direction, is as long as or longer than the longitudinal mesh axis.

Figure 8B:
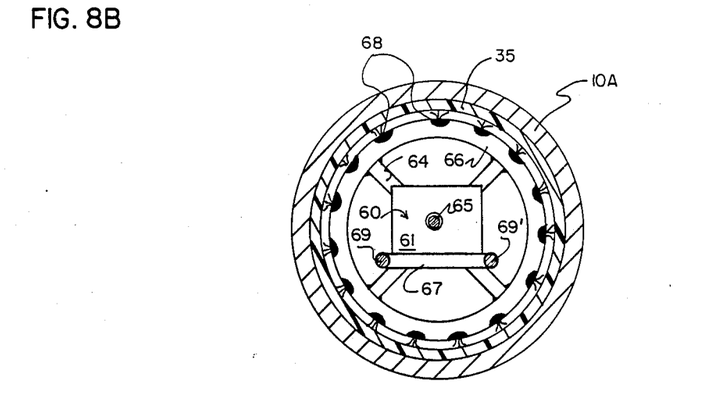

FIGS. 8A and 8B show, from the side and end, respectively, the application of foamable material by spraying it directly onto the placed matrix member and into the meshed interstices thereof from spraying apparatus 60. The apparatus is adapted to travel through the pipe in either direction from end to end. The active direction is right to left, as shown by an arrow in FIG. 8A. The spraying apparatus is shown as supported on three rodlike members extending lengthwise of the pipe: viz., axial shaft 65 and pair of lower shafts 69, 69' located side by side and spaced apart on lateral frame member 67, underlying spray material supply tank 61—through which shaft 65 passes (appropriately journaled and sealed). This three-point support provides considerable stability and also facilitates longitudinal movement of the apparatus through the pipe. The spraying apparatus is propelled by rack or screw action of at least one of the shafts, preferably the axial support shaft, but such detail is omitted as superfluous here.

The spraying apparatus receives foamable material 32 (thick liquid) from supply tank 61, which may have a lead-in tube (not shown) from outside the pipe—preferably at the left so it can be kept away from the sprayed material—and sprays it out of spaced openings 68 in spray ring 66, which is oriented crosswise of the pipe and mounted on hollow tubes 64 spaced at quarter circles of arc along—and interconnecting—the ring and the supply tank. The spraying of the foamable material itself may be actuated conveniently dependent upon travel through the pipe (as by pump gearing to the propulsion shaft) or by external hydraulic or pneumatic means requiring a tubing connection (not shown).

Figure 9A:
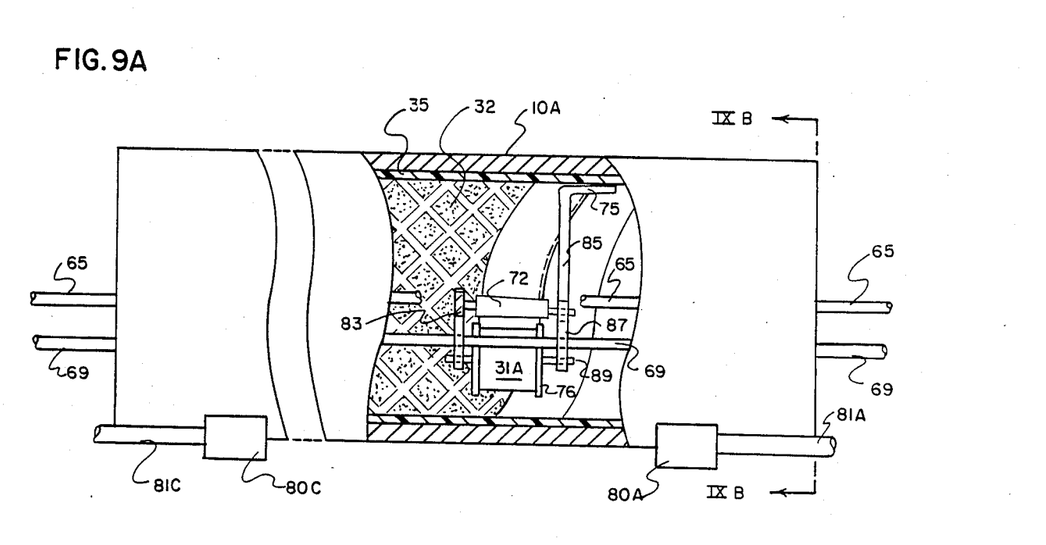
FIGS. 9A and 9B are a similar pair of sectional views of the application of an inner skin layer to the matrix member with foam present in the interstices of the matrix member in the pipe.
Figure 9B:
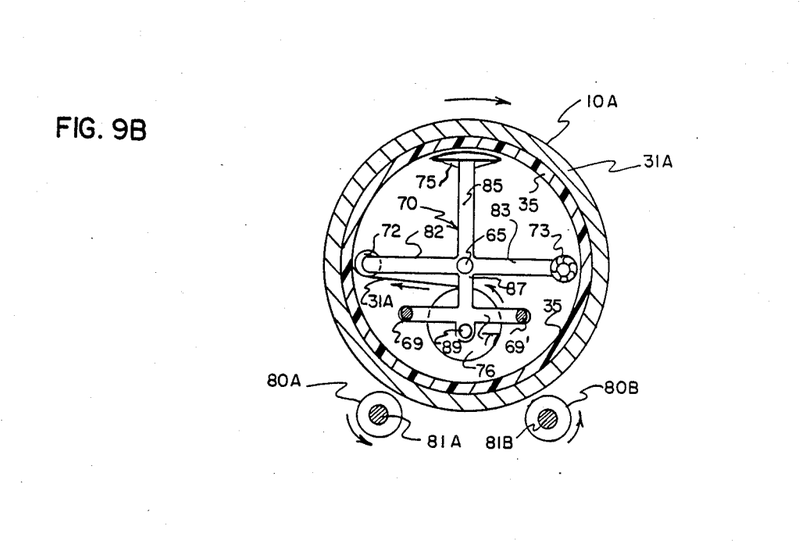

FIGS. 9A and 9B show, also from side and end, respectively, application of the inner skin layer to the matrix member, which now has foamable material 32 within its interstices. Laminating apparatus 70 is supported on trio of shafts 65, 69, and 69' for travel through the pipe in the same manner as just shown for the spraying apparatus. However, here the pipe itself is mounted rotatably on at least four cylindrical rollers, including roller 80A on axle 81A and roller 80B on axle 81B, both visible in FIG. 9A; also roller 80C on axle 81C, as well as roller 80A on axle 81A, visible in FIG. 9B. The rollers are driven in any suitable manner to rotate the pipe clockwise (as shown by an arrow at the top of FIG. 9B) while the laminating apparatus remains upright.

Viewed transversely, as in FIG. 9A, the laminating apparatus frame is cruciform, with drum 76 of inner skin strip material 31A underslung on axle 89 at the bottom of base leg 87. A transverse frame member extends to both sides from the top of the base leg at axial level and supports rolls at its ends. Left arm 82 of the transverse frame member carries application roll 72 for the skin material, while right arm 83 carries wiper roll 73—shown sectioned because offset toward the viewer, as more clearly shown in FIG. 9B. Vertical arm 85 extending upward above the axis carries heat-sealing shoe 75 in contact with the lining surface.

Laminating apparatus 70 travels through the pipe much as spraying apparatus 60 did but performing additional steps in the lining of the pipe and completing the lining. Rotating guide roll 72 (suitably driven, as by rack or screw on one of the shafts) unwinds a strip of skin film 31A from drum 76 and wraps it helically onto the inner cylindrical surface of the matrix member, at a rate coordinated with the pipe rotation and the rate of travel of the laminating apparatus through the pipe so that the trailing edge of each new wrap laps the leading edge of the last preceding wrap. Shoe 75, heated in any suitable manner (as electrically through wiring—not shown—via an end of the pipe), passes along in contact with the overlapping edges and heats them and the underlying matrix member sufficiently to seal the edges together and to tack them to the matrix member. If desired, one or more additional heat-sealing shoes may be installed to tack the inner skin to the matrix member between overlap seams. For best tacking action, wiper roll 73—offset ahead of the wrap edge—precedes the leading wrap to wipe off any foamable material (if not likely to adhere the skin material to the matrix member) from the facing cylindrical surface of the matrix member.

Foaming of the foamable material is induced suitably (as by injection of hot air) in the pipe of FIGS. 8A, 8B, 9A, and 9B after the inner skin is completed. The end result is equivalent to the lining previously described and shown (in FIGS. 6A and 6B). The pipe so lined may be understood as either unused (i.e., not yet part of a transparent pipeline) or as part of an installed sewer or other pipeline temporarily removed for maintenance or repair.

Proper temperature control is important during the polymer extrusion, and in forming the resulting flexible matrix member and skin(s) and in activating the foamable or optionally storing and transporting such lining material and installing it without activating the foaming agent until desired so as to complete installation of the lining. However, nearly every material and every installation can be expected to differ somewhat from every other, and both suitable material selection and suitable control of temperature are well within the capabilities of persons skilled in polymer extrusion, tubing formation, and pipe lining. Ability to line pipes competently, whether by this or another method, is best developed on the job, as with the benefit of this specification.

Thermoplastic polymeric compositions are preferred for forming the skin layer(s), such as medium density homopolymers, copolymers, or interpolymers of ethylene, propylene, and/or butene; such inert polymers are suitable for lining most pipelines and, because of their lack of toxicity, are especially suitable in pipes for water intended for human or animal consumption or for crop irrigation. Even if the foam layer contains—which usually it need not do-noxious catalysts or traces of toxic unreacted or byproduct chemicals, the inner skin will seal them off from the transported liquid. Lining materials for reactive chemicals will pose similar problems and be selected for specific tolerance to such chemicals.

Other skin layer compositions include acrylic copolymers, such as methyl acrylate and methyl methacrylate; vinyl and vinylidene polymers, such as their chlorides; linear polyesters, such as polyethylene terephthalate; polyamides, such as polycaprolactam and polyhexamethylene adipamide; thermoplastic polyurethanes; cellulose esters of lower aliphatic acids, such as acetic acid, propionic acid, or butyric acid; polyacetals; and polycarbonates. Abrasion-resistant compositions, such as the noted nylons, are especially suited in pipelines for slurries of coal or other finely divided solids. Pipelines for gaseous hydrocarbons and other gases are usually under considerable internal pressure, which may fluctuate widely; the lining material should tolerate such conditions well enough, as the polyacetals can be expected to, and also the polycarbonates. The nature of the foam composition, as well as of the skin material, can be expected to be a factor in some of the more exotic uses.

Many monomeric or low polymeric precursors of the polymers for the skin layer(s) are suited (together with appropriate additives) for the foamable layer. In addition to being less dense than the skin layer, the foam layer can be expected to be rigid instead of flexible, as both polymerization and foaming of the foamable layer are delayed until the tubing is in place inside a pipe to be lined thereby. Such rigidity can result from as small a change as extending the time of polymerization (as by continued heating) or may depend upon more catalyst (such as a peroxide) or added multifunctional cross-linking agents (such as diols), or a copolymerizable ingredient from the same chemical category or even from a different one (e.g., styrene).

Indeed, some of the simpler materials may be or become thermosetting when sufficiently cross-linked or even by inclusion of conventional epoxy or melamine-, phenol-, or urea-formaldehyde thermosetting components. Reaction rates may be more rapid with on-site extrusion and are designedly slow when off-site extrusion is followed by appreciable periods of storage or transportation of the still flexible tubular lining material. One method of inhibiting reaction is preadjustment of pH away from the reactive range, thus to higher values where acid-reactive, or to lower pH values where a alkaline-reactive, so long as increased temperature will overcome the inhibition—as it usually will.

Foaming may be provided by an ingredient used as a catalyst, cross-linking agent, or even as a copolymerizable component, if it (or its reaction with another component) produces a gaseous product, such as ammonia (e.g., from amines), carbon dioxide (e.g., from carbonates), lower hydrocarbon (e.g., from esters), acidic vapor such as hydrogen chloride (e.g., from acids), or water vapor (e.g., from acids and alcohols). Selection of such ingredients that react little at ordinary ambient temperatures and below but that react adequately at elevated temperatures below the boiling temperature of water is within ordinary chemical skill. A foaming material that will adhere to the inner skin and to the pipe wall (or any outer skin) is advantageous.

Catalysts, in addition to organic materials such as suggested above, include hybrid organo-metallic compositions, e.g. aluminum alkyl; also metal salts, e.g., zinc, nickel, or cobalt chlorides—and oxides of such metals. It will be understood that catalyst selection is highly dependent upon the polymeric components being processed, of course. Conventional choices are readily made and are likely to be suitable. Optimal selection is made more complicated because of the wide variety of possible catalysts and operations. Materials as simple as ammonium carbonate and sodium bisulfate can function both as catalyst and foaming agent with a wide range of polymerizable materials, e.g., acrylics, vinyls, and even acetals.

Processing parameters include not only temperature, which has been emphasized above, but also extruded thicknesses, rates of extrusion and forwarding, and relaxation of the outer skin layer (if any). The pipe dimension to be lined (actually the inside circumference, although usually loosely specified in terms of the equivalent "diameter") usually affects the values of these parameters to a significant extent.

A small pipe makes less of a demand upon skin layer strength and might suffer a capacity loss from a thick matrix member or foamed layer, whereas a large pipe usually requires a strong inner skin, usually a thicker matrix member and/or foam layer, and may even undergo an increase in capacity upon being lined despite the consequent loss in cross-sectional area, because of a substantial reduction in coefficient of surface friction. In a one-foot pipe the overall lining thickness may be as little as 5 to 15 mm, whereas in a one-meter pipe about 20 to 50 mm should be more suitable. In general, the finished thicknesses of matrix member to inner skin should be in a ratio range from about 5:1 to 25:1, and the foamed layer to the matrix member about 3:2 to 4:1.

As an example, in a 1-ft. water pipe, an extruded thickness of 3 mm for the inner skin, 15 mm for the matrix member, and an additional 15 mm (total thickness 30 mm) for the foamed layer are sufficient. As another example, in a 1-meter sewer, an inner skin layer 5 mm thick, matrix member 20 mm thick, and an added 30 mm (total 50 mm) thick foamed layer are preferable. Slurries make additional demands upon thickness and abrasion resistance of the inner skin layer. Outer skin layers, when present, usually need be no thicker than the inner skin layer and may be thinner.

Advantages of this invention have been noted above and will become fully apparent to those who undertake to practice it, along with other benefits, as by having pipes lined thereby or receiving materials transported via such pipelines. Economy of maintenance is a prime consideration for pipes made—as they all are—of degradable materials, especially those whose installation and interruption costs either approach or exceed their purchase price, even without this lining added.

Although preferred embodiments of the present invention are shown and described here, useful modifications may be made, as by coating the inside wall (of a clean pipe) with catalyst for prompt foaming of the foamable material—however applied—upon contact with the pipe. If the desired size of matrix member is not readily at hand, a larger tubular size may be slit lengthwise and be trimmed to the desired size and then be inserted into the pipe, with or without being joined (with adhesive, heat-sealing, or fasteners) along the cut edges. Even a sufficiently flexible flat meshed matrix member may be pressed into service similarly if no better alternative is available. Other revisions may be made, as by adding, combining, deleting, or dividing parts or steps, while retaining advantages and benefits of the invention, which itself is defined in the following claims. The claimed invention:

I claim:

1. Method of lining the wall of a water, sewage, slurry, liquid or gaseous hydrocarbon, or like material-transporting pipe, above or below ground, comprising the steps of
    forming composite lining material having an inner skin layer and a foamable contiguous layer, including
        supporting the aforesaid layers upon a flexible open-mesh matrix member in tubular form , and
    placing such composite lining adjacent such wall thereof,
        including foaming the foamable layer outward into contact with the wall.

2. Pipe lining method according to claim 1, including placing foamable material within the interstices of the meshed matrix member, and juxtaposing the inner skin layer adherently to the inner tubular surface of the matrix member, before insertion into the pipe.

3. Pipe lining method according to claim 2, including forming the matrix member and the inner skin layer substantially simultaneously by extrusion.

4. Pipe lining method according to claim 2, including juxtaposing an outer skin layer adherently onto the outer tubular surface of the matrix member, with the foamable material in the interstices of the matrix member.

5. Pipe lining method according to claim 1, including deferring placing foamable material within the interstices of the meshed matrix member, and juxtaposing the inner skin layer adherently to the inner tubular surface of the matrix member, until after insertion into the pipe.

6. Pipe lining method according to claim 5, including interposing an outer skin layer between the matrix member and the inside wall of the pipe.

7. Lining a pipe, comprising the steps of providing a netlike fused strand open-meshed matrix member in tubular form of similar size crosswise and flexible both lengthwise and crosswise, applying axial tension to the matrix member, thereby temporarily increasing its length and reducing its crosswise dimensions sufficiently to be insertable into the pipe, inserting the matrix member into the pipe under such tension, and then releasing the tension on the matrix member, whereupon it expands toward its previous crosswise dimensions and against the inside wall of the pipe.

8. Pipe lining method according to claim 7, wherein the interstices of the matrix member have had foamable material applied therein, and including the step of foaming the material therein and outwardly against the inside wall of the pipe.

9. Pipe lining method according to claim 8, including juxtaposing an inner skin layer adherently onto the inner tubular surface of the matrix member.

10. Pipe lining method according to claim 9, wherein the foamable material and the inner skin layer are applied to the matrix member after inserting it into the pipe.

11. Pipe lining method according to claim 10, wherein the pipe is so lined before being placed into use.

12. Pipe lining method according to claim 9, wherein the foamable material and the inner skin layer are applied to the matrix member before inserting it into the pipe.

13. Pipe lining method according to claim 12, wherein the pipe is used for transport of fluid or fluidized material therethrough before being lined with the composite tubular material and then is so lined and the foamable layer thereof so foamed and solidified in place against the pipe wall.

14. Method of lining a pipeline or similar circumferential passageway-defining structure, comprising extruding a flexible tubular open diamond-meshed meshed matrix member matched to the pipe in crosswise dimensions, the matrix member being extensible lengthwise and thus reducible in size crosswise, applying foamable material to the interstices of the meshed matrix member, adhering an inner skin layer of polymerized material against the inwardly directed surface thereof, tensioning the matrix member to increased length and decreased cross section, pulling the resulting composite tubing into and along the inside wall of such structure, then releasing the tension and thereby enabling the matrix member to expand into contact with the inside wall of the structure, and foaming the foamable layer in place.

15. Passageway lining method according to claim 14, wherein the foamable layer expands to fill the interstices of the matrix member and expands outward against the inside wall and then solidifies.

16. Pipeline or similar circumferential passageway-defining structure lined according to the method of claim 14.

17. In a method of lining and thereby maintaining a water, sewage, slurry, liquid or gaseous hydrocarbon, or like material-transporting pipe with a tubular composite lining material, comprising the steps of
    applying foamable material to a temporarily extensible open-meshed tubular matrix member, and
    lining the matrix member inner surface with a skin layer adherent thereto, thereby forming tubular composite lining material,
    and then foaming the foamable layer and thereby enlarging the adjacent surface of the tubular composite lining material toward the inside wall of a surrounding pipe.

18. In the pipe lining method according to claim 17, wherein the composite lining material is formed outside whatever is to be lined thereby, and including the further steps of inserting the lining material thereinto and subsequently foaming the foamable material.

19. In the pipe lining method according to claim 17, wherein the composite lining material is formed inside whatever is to be lined thereby, and including the steps of inserting the matrix member thereinto, then applying the foamable material to the matrix member before lining it with the skin layer, and later foaming the foamable material.

20. In the pipe lining method according to claim 17, including tensioning the matrix member lengthwise, thereby reducing it in diameter while inserting it into whatever is to be lined, and releasing the applied tension when the matrix member is at the desired lining location therein.

21. Pipe lining method comprising the following steps:

forming composite lining material having as components an open-mesh matrix member, a skin layer, and a layer of foamable material at least partly filling the open-mesh interstices, about the cross-sectional shape and size of a pipe to be lined therewith, including locating such skin layer contiguous both with the radially inward surface of the matrix member and with foamable material in the interstices thereof, and placing composite lining material inside a pipe to be lined thereby and adjacent the inside wall thereof, including foaming the foamable material outward and into contact with the pipe wall.

22. Pipe lining method according to claim 21, including forming the composite lining material outside the pipe to be so lined, extending the lining material, thereby reducing its cross-section somewhat, and pulling it into the pipe before performing the foaming step.

23. Pipe lining method according to claim 22, including the steps of extruding such skin layer, applying such foamable material to the skin layer, and then juxtaposing the skin layer with the foamable material thereon adherently to such matrix member, thereby forcing foamable material into the interstices thereof.

24. Pipe lining method according to claim 21, including forming the composite lining material inside the pipe to be so lined, and performing the foaming step thereafter.

25. Pipe lining method according to claim 23, including placing such matrix member against the inside wall of the pipe, applying such foamable material into the open-mesh interstices thereof, and then adhering a skin layer to the radially inward surface of the matrix material before performing the foaming step.

26. Pipe lining method according to claim 25, including forming both the matrix member and the skin layer from strips of the respective component materials by winding the same helically adjacent the inside wall of the pipe to be lined thereby to form a tubular structure slightly smaller than such pipe.

* * * * *